United States Patent
Deparis et al.

(10) Patent No.: US 12,330,312 B2
(45) Date of Patent: Jun. 17, 2025

(54) METHOD FOR AUTOMATICALLY PERFORMING AN OPERATION ON AN OBJECT WITH A TOOL CARRIED BY A POLYARTICULATED SYSTEM

(71) Applicants: Orano DS—Démantèlement et services, Gif-sur-Yvette (FR); Siléane, Saint-Etienne (FR)

(72) Inventors: Jean-Louis Deparis, La Talaudiere (FR); Hervé Henry, Saint-Cyr-les-Vignes (FR); Jean-François Thro, Suresnes (FR)

(73) Assignees: ORANO DS—DÉMANTÈLEMENT ET SERVICES, Gif-sur-yvette (FR); SILÉANE, Saint-Etienne (FR)

( * ) Notice: Subject to any disclaimer, the term of this patent is extended or adjusted under 35 U.S.C. 154(b) by 227 days.

(21) Appl. No.: 17/906,142

(22) PCT Filed: Mar. 5, 2021

(86) PCT No.: PCT/FR2021/050380
§ 371 (c)(1),
(2) Date: Sep. 12, 2022

(87) PCT Pub. No.: WO2021/181035
PCT Pub. Date: Sep. 16, 2021

(65) Prior Publication Data
US 2023/0106854 A1   Apr. 6, 2023

(30) Foreign Application Priority Data
Mar. 13, 2020   (FR) ..................... 2002515

(51) Int. Cl.
B25J 9/16   (2006.01)

(52) U.S. Cl.
CPC ........... *B25J 9/1666* (2013.01); *B25J 9/1605* (2013.01); *B25J 9/1697* (2013.01)

(58) Field of Classification Search
CPC ...... B25J 9/1666; B25J 9/1605; B25J 9/1697; B25J 9/1664; B25J 9/0096; B25J 9/1671;
(Continued)

(56) References Cited

U.S. PATENT DOCUMENTS 9,669,543 B1   6/2017   Stubbs et al.
9,671,777 B1*  6/2017   Aichele .................. B25J 9/1666
(Continued)

FOREIGN PATENT DOCUMENTS

CN   109822579 A   5/2019
CN   110524581 A   12/2019
(Continued)

OTHER PUBLICATIONS

WO-2007090557-A2 translation (Year: 2007).*
(Continued)

*Primary Examiner* — Kyle T Johnson
(74) *Attorney, Agent, or Firm* — McDonald Hopkins LLC

(57) ABSTRACT

Automatically performing an operation on an object-with a tool-carried by a polyarticulated system-that can be moved in a working environment, the object-and the working environment being open-ended or insufficiently defined to carry out the operation. A method comprises: capturing a scatter plot image of the object-and the working environment-with a 3D sensor, merging this image with the CAD model of the system and the environment into a working image, and defining anti-collision parameters;— defining a path of the tool-on the portion of the working image representing the object and executing a simulation of the corresponding movement of the system-and the tool in the working image so as to ensure that the operation is fea-
(Continued)

sible;— and if the operation is feasible executing the actual movement of the system carrying the tool-according to the path defined for performing the operation on the object.

10 Claims, 6 Drawing Sheets

(58) Field of Classification Search
CPC ........... B25J 19/02; G05B 2219/40442; G05B 2219/40475; Y02E 30/30
See application file for complete search history.

(56) References Cited

U.S. PATENT DOCUMENTS

| | | | |
|---|---|---|---|
| 2006/0161382 A1* | 7/2006 | Kaneyasu | G01B 11/2518 |
| | | | 702/168 |
| 2009/0234499 A1* | 9/2009 | Nielsen | B25J 9/161 |
| | | | 700/250 |
| 2010/0017407 A1* | 1/2010 | Beniyama | G06F 16/5854 |
| | | | 707/E17.016 |
| 2016/0214143 A1 | 7/2016 | Nagatsuka | |
| 2016/0229061 A1* | 8/2016 | Takizawa | G05B 15/02 |
| 2016/0332273 A1 | 11/2016 | Furuya | |
| 2017/0144300 A1* | 5/2017 | Oumi | B25J 9/161 |
| 2018/0036882 A1* | 2/2018 | Kimura | B25J 9/1664 |
| 2018/0297204 A1* | 10/2018 | Krasny | B25J 9/163 |
| 2018/0343385 A1* | 11/2018 | Mimura | H04N 23/80 |
| 2019/0262995 A1* | 8/2019 | Kell | B25J 9/1666 |
| 2020/0070340 A1* | 3/2020 | Kurtz | B25J 9/1664 |
| 2022/0322592 A1* | 10/2022 | Rinne | H05K 13/0486 |
| 2023/0106854 A1* | 4/2023 | Deparis | B25J 9/1697 |
| | | | 700/255 |
| 2023/0158679 A1* | 5/2023 | Wen | B25J 9/161 |
| | | | 700/259 |
| 2024/0042605 A1* | 2/2024 | Zhang | B25J 9/1684 |

FOREIGN PATENT DOCUMENTS

| | | | | |
|---|---|---|---|---|
| CN | 112091971 A | * | 12/2020 | ........... B25J 9/1602 |
| EP | 2511055 A1 | | 10/2012 | |
| EP | 3744482 A1 | * | 12/2020 | ........... B25J 9/1676 |
| FR | 2896441 A1 | * | 7/2007 | ........... B25J 9/1671 |
| JP | 08328632 A | | 12/1996 | |
| JP | 2019034352 A | | 3/2019 | |
| WO | WO-2007083039 A2 | * | 7/2007 | ........... B25J 9/1671 |
| WO | WO-2007090557 A2 | * | 8/2007 | ........... B25J 9/1671 |

OTHER PUBLICATIONS

WO-2007083039-A2 translation (Year: 2007).*
FR-2896441-A1 translation (Year: 2007).*
EP-3744482-A1 translation (Year: 2020).*
CN-112091971-A translation (Year: 2020).*
Efficient_3D_robotic_mapping_and_navigation_method (Year: 2024).*
International Search Report for PCT/FR2021/050380 dated Apr. 23, 2021.
Written Opinion for PCT/FR2021/050380 dated Apr. 23, 2021.
Search Report for French application No. 2002515 dated Nov. 6, 2020.

* cited by examiner

METHOD FOR AUTOMATICALLY PERFORMING AN OPERATION ON AN OBJECT WITH A TOOL CARRIED BY A POLYARTICULATED SYSTEM

CROSS-REFERENCE TO RELATED APPLICATIONS

This is a National Stage of PCT international application PCT/FR2021/050380, filed on Mar. 5, 2021, which claims the priority of French Patent Application No. 2002515, filed Mar. 13, 2020, both of which are incorporated herein by reference in their entirety.

TECHNICAL FIELD

The present invention relates to the technical field of performing any operations, for example cutting, welding, marking, stripping, painting, surfacing, positioning a sensor or any type of analysis tool, etc., on an object present in a working environment, the positions and geometries of the object and the working environment being possibly changing and/or insufficiently defined to be able to perform said operations.

For example, the invention applies to the technical sector of dismantling, in which operations of measuring, cutting, gripping of objects possibly presenting risks related to radioactivity are carried out, without this being limiting.

The invention more accurately relates to a method and a facility for automatically performing an operation on an object with a tool carried by a polyarticulated system and movable in a working environment, the positions and geometries of the object and of the working environment being changing and/or insufficiently defined to be able to perform said operation in automatic mode. The operation can be of any nature in any type of environment, with any type of tool and performed on any type of object. The present invention finds an advantageous application, for example, in performing an operation on an object in a risky and confined environment, inaccessible to an operator or in which an operator has difficulty moving.

PRIOR ART

In the field of the invention, and for example that of dismantling radioactive objects, dismantling operations can be performed manually by an operator in a confined environment.

Dismantling operations comprise operations of measuring, cutting and gripping the object. In particular, the purpose of the cutting operation is to generate smaller elements with a view to optimising filling of the waste containers into which they are introduced, for example. These smaller parts have therefore to be taken by the system to be introduced into the container.

These different operations are performed by an operator equipped with an angle grinder, for example, or any type of tool enabling him/her to carry out the operations concerned, and with restrictive protective equipment (e.g. ventilated suit, anti-cutting gloves, etc.), particularly in view of the radioactive environment of the workshop in which he/she is working, and the nature of the operation to be carried out.

The performance of these operations is therefore not optimal, either in terms of safety for the operator or in terms of difficulty and duration.

In other cases, the operations cannot be carried out by an operator in contact, and the tool (for measuring, cutting, gripping) should then be carried by a polyarticulated system to perform this operation. The operator drives the system remotely by means of a control horn, with indirect vision using cameras and screens. Drawbacks of such a system are, on the one hand, its high cost and, on the other hand, the inaccuracy of its control in terms of speed, effort and positioning, resulting in a long completion time and premature wear of the tool consumables (blades, discs).

DESCRIPTION OF THE INVENTION

The invention aims to remedy the drawbacks of prior art by providing a method and a facility for performing an operation on an object in a working environment, making it possible to ensure optimum conditions of safety, precision and speed.

To this end, a method for automatically performing an operation on an object with a tool carried by a polyarticulated system movable in a working environment has been developed.

According to the invention, the method comprises at least:
a step A of:
  capturing an image of the object and of all or part of the working environment, with at least one 3D sensor, in the form of an overall point cloud,
  merging this image with a pre-existing CAD model of the polyarticulated system and a possible pre-existing CAD model of all or part of the as-built environment, resulting in a work image and
  defining anti-collision parameters;
a step B of defining, preferably by the operator, a trajectory of the tool on the part of the work image representing the object, and executing a simulation of the corresponding movement of the polyarticulated system and the tool in the work image to ensure that the operation is feasible;
a step C of, if the operation is feasible according to step B, executing the actual movement of the polyarticulated system carrying the tool along the trajectory defined to perform the operation on the object.

For the purposes of the invention, 3D sensor means any means of digitising an object or part of an object in the form of a three-dimensional image, and comprises in particular 3D cameras, laser scanners, video means, webcams, etc.

The anti-collision parameters are, for example, threshold distances from which safety actions are automatically performed, such as total stop of any motion or reduction in the speed of movement of the polyarticulated system and the tool, for example up to a threshold speed which is thereby an anti-collision parameter.

In this way, the invention makes it possible to carry out operations in an initially uncertain or unknown or inaccessible environment in automatic mode and remotely, while guaranteeing their correct execution.

The invention is advantageous in that, before any movement of the polyarticulated system, the working environment is digitised in the form of an overall point cloud. In this way, the position of the various obstacles to the movement of the polyarticulated system, namely elements present in the working environment and the object on which the operations are to be carried out, is known. Thus, any collision between the polyarticulated system or its tool and elements of the environment can be avoided, by virtue of the anti-collision parameters.

This is particularly advantageous when the working environment is not directly visible to the operator controlling the method taking place. The operator visualises the working environment and the object on the display as a point cloud, and defines a tool movement trajectory to perform the desired operation, for example a cutting operation.

The invention is also advantageous in that the method makes it possible to execute a simulation, particularly in CAD, of the corresponding movement of the polyarticulated system and its tool to ensure that the movement can performed without collision.

Then, if the simulation of the movement confirms its feasibility, the actual movement of the polyarticulated system carrying the tool can executed to perform the operation as such on the object.

The method is thus performed in at least three steps, namely:
- a step A of securing the environment and the object by digitisation in the form of an overall point cloud,
- a step B of defining and simulating trajectories, and
- a step C of executing.

Preferably, the method also comprises a step A', between step A and step B, of controlling the movement of the polyarticulated system to capture detail images of zones of the object with a 3D sensor carried by the polyarticulated system, in the form of a point cloud that is denser and more accurate than the overall point cloud, and integrating the captured images of the corresponding zone of the object into the work image, as a replacement for the corresponding part from the overall point cloud.

This additional step provides an improved work image with increased accuracy for defining the different trajectories of the operation to be performed. Furthermore, this additional step also makes it possible to capture images of zones not visible to the sensor used for step A, by virtue of the movement of the polyarticulated system, and thus to complete the work image.

The 3D sensor carried by the polyarticulated system may be permanently attached thereto, or it may be stored nearby. In the latter configuration, the method comprises a step A", between step A and step A', of automatically moving the polyarticulated system to grip and connect to the 3D sensor stored nearby.

According to one particular embodiment, the method comprises a step C', between step B and step C, of automatically moving the polyarticulated system to optionally disconnect and deposit a 3D sensor, and connect to the tool stored nearby.

This characteristic allows for a plurality of tools to be stored nearby for connection to the polyarticulated system.

Assuming that several different tools are available, the method also comprises, prior to step B, a step B' of selecting, in and for the simulation of step B, from a tool database, the tool that has to perform the operation.

Advantageously, and in order to avoid damaging the tool, the method is also remarkable in that, during step C, the speed of movement of the polyarticulated system carrying the tool in direct contact with the object may, as required, be regulated in real time based on a direct or indirect measurement of the force undergone by the tool. In order to secure movements of the polyarticulated system carrying the 3D sensor during step A', the speed of movement of the polyarticulated system is automatically reduced when the 3D sensor or part of the polyarticulated system approaches the object or an element of the working environment, and the movement is automatically stopped when the 3D sensor or a part of the polyarticulated system is at a safe distance from the object or an element of the working environment, in accordance with the anti-collision parameters defined in step A.

The definition of the trajectory of the tool on the part of the work image representing the object according to step B consists in positioning on the work image either at least one starting point-ending point pair, or at least one predefined geometrical figure chosen from a library comprised for example of at least one line, planes, masks, etc. The invention also relates to a facility for implementing the method described hereinabove, characterised in that it comprises a polyarticulated system and at least one 3D sensor, connected to a computer processing system and to a display, designed to:
- represent on the display an overall point cloud of the object and all or part of the working environment from images captured by at least one 3D sensor;
- represent a work image resulting from merging of the overall point cloud, a pre-existing CAD model of the polyarticulated system and a possible pre-existing CAD model of all or part of the environment as built, the computer processing system also being arranged to enable a trajectory of the tool to be defined over the part of the work image representing the object, and to execute a simulation of the corresponding movement of the polyarticulated system and the tool in the work image to ensure that the operation is feasible, and if the operation is feasible, to execute the actual movement of the polyarticulated system carrying the tool in accordance with the defined trajectory to perform the operation as such on the object.

Advantageously, the facility comprises means for regulating, during step C and in real time, the speed of movement of the polyarticulated system carrying a tool in direct contact with the object, based on a direct or indirect measurement of the force undergone by the tool.

BRIEF DESCRIPTION OF THE DRAWINGS

Further characteristics and advantages of the invention will become clearer from the following description, by way of indicating and in no way limiting purposes, with reference to the appended figures, wherein.

DETAILED DISCLOSURE OF THE INVENTION

Figure 1:
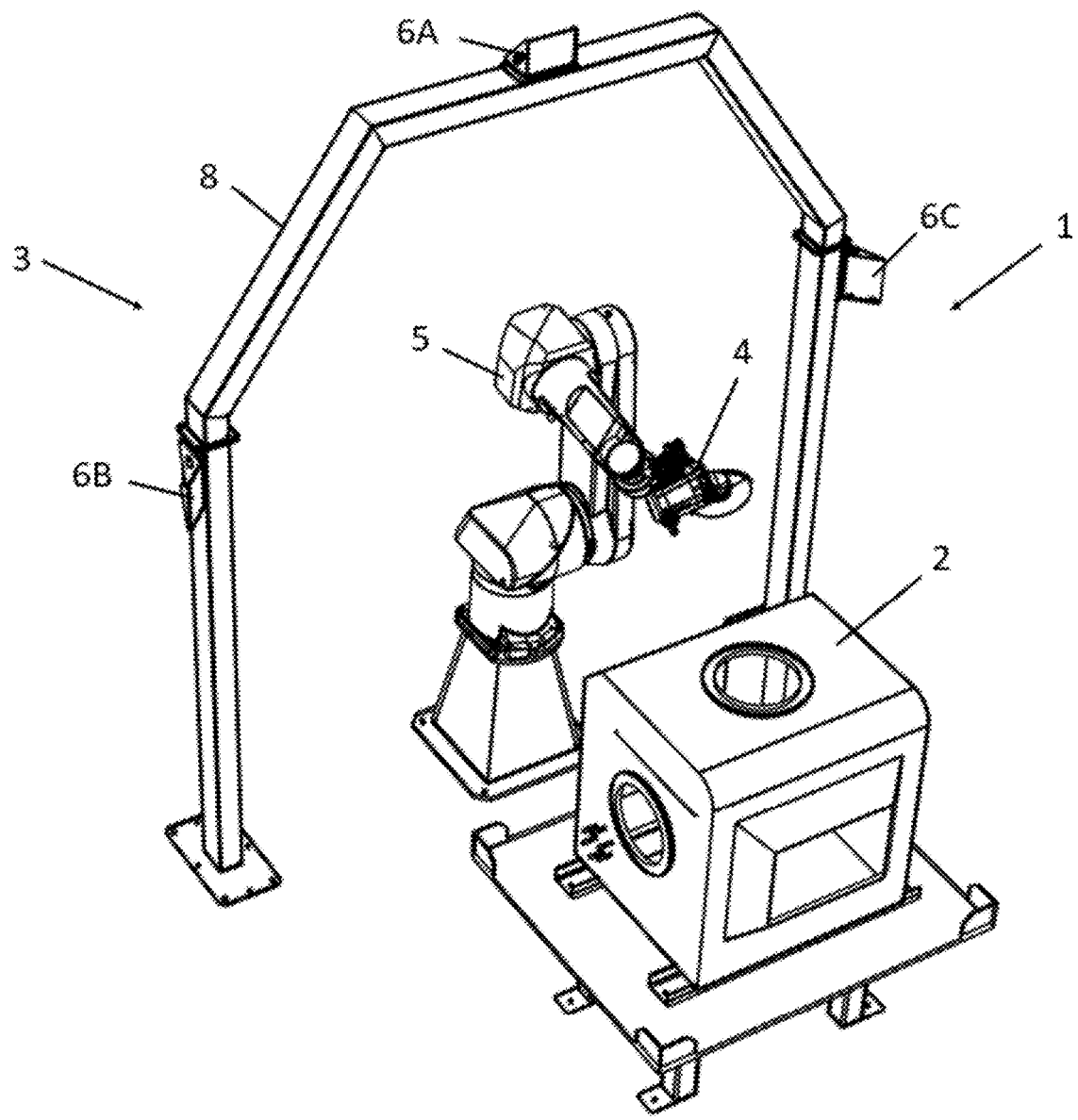
FIG. 1 is a schematic perspective representation of the facility according to the invention, illustrating the polyarticulated system carrying the tool, in its working environment and for performing an operation on an object.

The invention relates to a method and a facility (1) for automatically performing an operation on an object (2) positioned in a working environment (3).

The invention is not limited to one operation in particular, and may relate to an operation of measuring, cutting, gripping, welding, writing, marking, stripping, painting, surfacing, positioning a sensor or any type of analysis tool, etc. The operation as such is carried out by means of a tool (4) carried by a polyarticulated system (5) movable in the working environment (3).

The object (2) on which the operation is to be performed according to the method of the invention may be of any nature, such as for example a radioactive object or any other object to be dismantled, or an object to be repaired, welded, etc.

The working environment (3) related to the object (2) may be of any nature, such as, for example, a risky, confined working environment, inaccessible to an operator or in which an operator has difficulty moving, such as a radioactive environment for example, or work at height.

Figure 3:
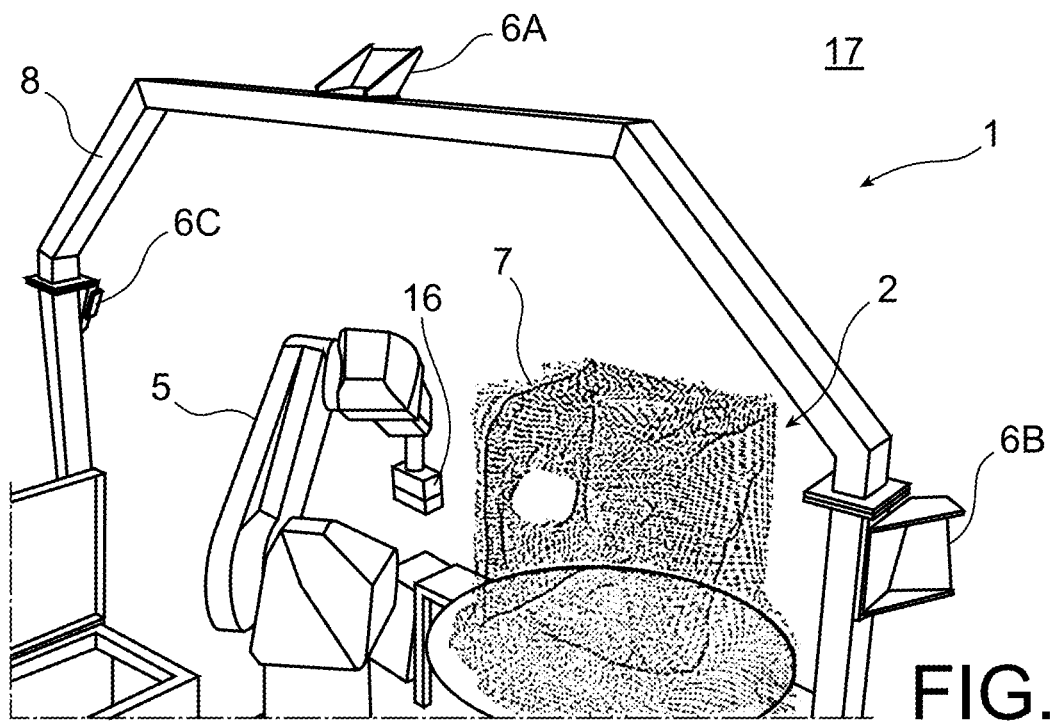
FIG. 3 illustrates in a perspective view the representation on the display of the merging, into a work image, of an overall point cloud of the object and part of the working environment, obtained from images captured by a 3D camera on the one hand and the CAD model of the polyarticulated system on the other hand.

With reference to FIG. 1, the facility (1) comprises a polyarticulated system (5), especially in the form of a robotic arm movable in all directions and in the working environment (3). The facility (1) comprises at least one 3D sensor, for example a 3D camera (6A, 6B, 6C) for capturing an image of the object (2) and of all or part of the working environment (3) in order to digitise it and to represent, by means of a known computer processing system and a display, a three-dimensional representation of an overall point cloud (7) of the object (2) and of all or part of the working environment (3). In the example illustrated, the facility (1) comprises three 3D cameras (6A, 6B, 6C) fixedly positioned on an arch (8) around and above the polyarticulated system (5). In order to perform operations on an object (2) securely and with reference to FIG. 3, the facility (1) implements a method comprising at least one step A of capturing, in the form of an overall point cloud (7), an image of the object (2) and of all or part of the working environment (3) with the 3D camera(s) (6A, 6B, 6C) attached to the arch (8), merging this overall point cloud (7) with a pre-existing CAD model of the polyarticulated system (5) and a pre-existing CAD model of the environment as built, such as that of the arch (8), and displaying the resulting work image (17) on a display (assembly of FIG. 3). This makes it possible to identify possible obstacles in the working environment (3) in order to secure movements of the polyarticulated system (5). It should be noted that all or part of the standard elements of the working environment (3), such as the arch (8), the 3D cameras (6A, 6B, 6C), the polyarticulated system (5) itself and its tool (4), may already be known, modelled in CAD.

In this way, it is possible to know movements of the polyarticulated system (5) and its tool (4) in relation to the different elements of the working environment (3) and to automatically avoid collisions, by virtue of the anti-collision parameters that have been previously defined.

To perform the desired operations on the object (2), the facility (1) preferably comprises a plurality of tools (4) of different types, and a 3D sensor, such as a 3D camera (16) stored nearby, for example in a dedicated bin.

This 3D camera (16) may be of the same type as the 3D cameras (6A, 6B, 6C) or different from them and, in the latter case, it will advantageously be more accurate than the 3D cameras (6A, 6B, 6C).

Thus, the method according to the invention advantageously comprises a step A", after step A, of automatically, and therefore safely, moving the polyarticulated system (5) to go and grip and connect to the 3D camera (16) stored nearby.

Figure 2:
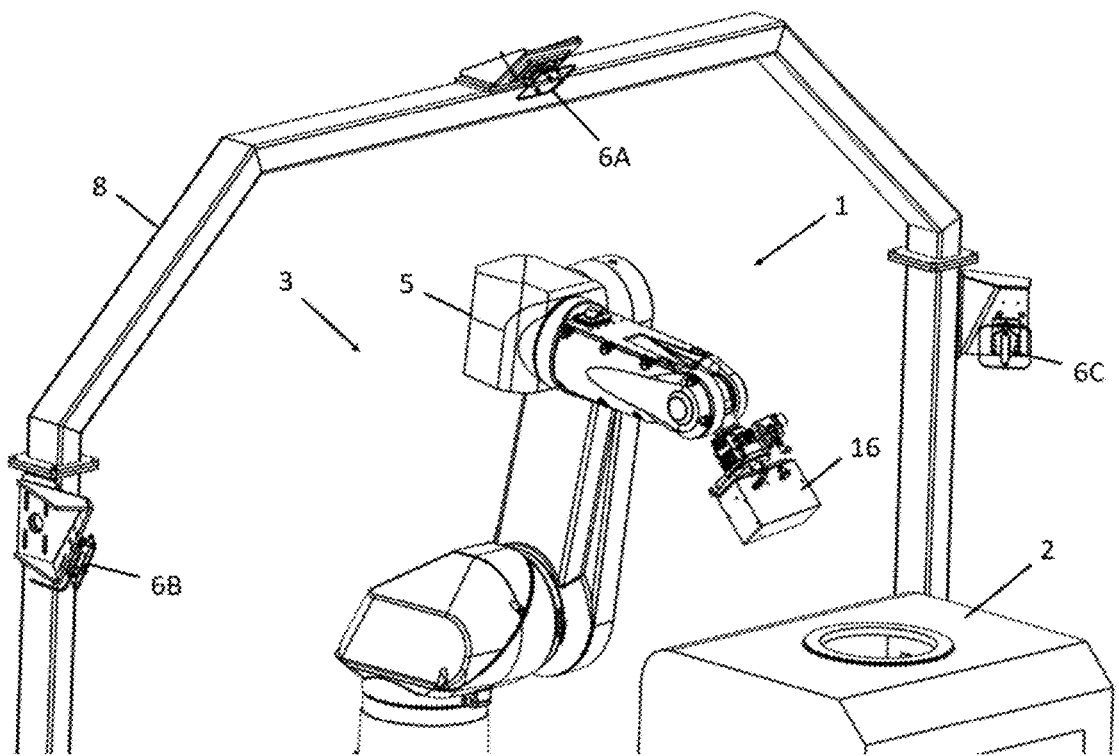
FIG. 2 is a schematic representation similar to that of FIG. 1, the polyarticulated system carrying a 3D camera.
Figure 4:
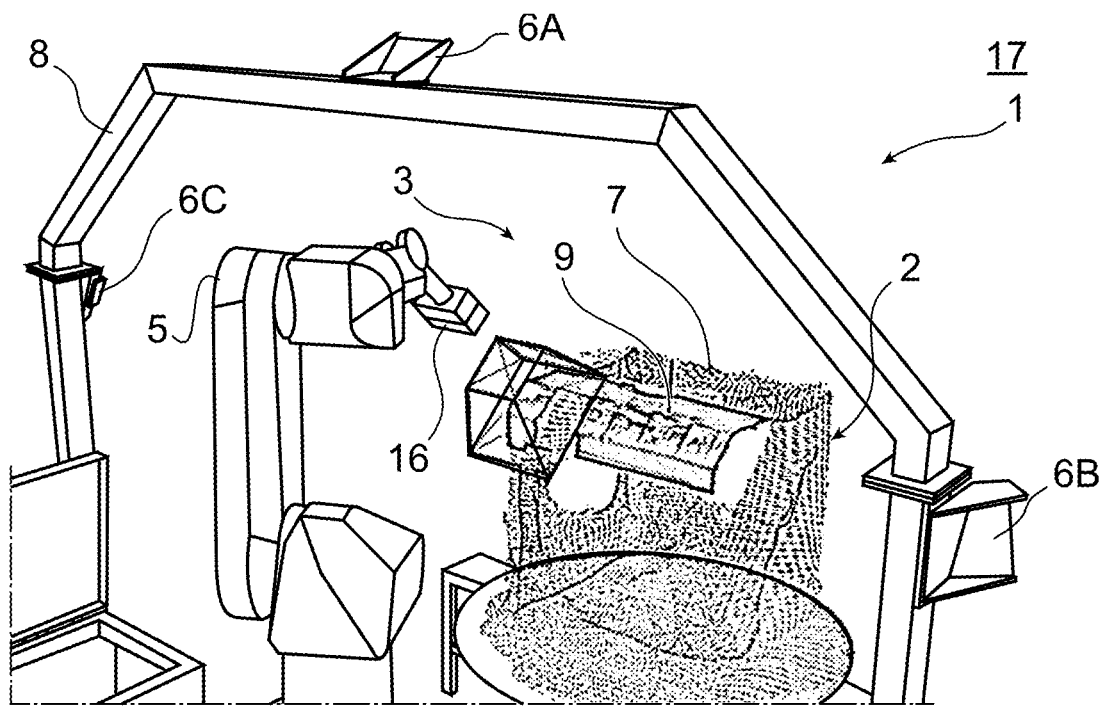
FIG. 4 is a similar view to that of FIG. 3, with the polyarticulated system carrying a 3D camera to capture images of object details, which are integrated into the work image, as a replacement for the corresponding part of the overall point cloud.

After the polyarticulated system (5) has gripped this 3D camera (16), the method comprises a step A', see FIG. 2, of controlling the movement of the polyarticulated system (5) to capture detail images of different zones of the object (2) with the 3D camera (16), which is more accurate than the 3D cameras (6A, 6B, 6C), in the form of a point cloud that is denser and more accurate than the overall point cloud (7) and integrating the captured images (9) of the corresponding zones of the object (2) into the work image (17), see FIG. 4, as a replacement for the corresponding part from the overall point cloud (7).

The movement of the polyarticulated system (5) to capture the different images is controlled, automatically or by an operator remote from the working environment (3), for example by means of a control lever and allows the capture of images of inaccessible zones, or for example by directly selecting specific zones on the overall point cloud (7), said selection causing the polyarticulated system to automatically move. In this configuration, the operator in practice selects a zone for which he/she wishes to improve modelling accuracy of the object. The software then calculates positions of the polyarticulated system (5) required to capture the images with the best viewpoints. As a reminder, the movement of the polyarticulated system (5) is carried out without collision between the polyarticulated system (5), the 3D camera (16), the object (2) and elements of the working environment (3), since everything is modelled through the work image (17), either in CAD, or through the overall point cloud (7), or through the images (9) of details.

In addition, and in order to improve operational safety of the facility (1), during step A', the speed of movement of the polyarticulated system (5) is automatically reduced when the tool (4) or part of the polyarticulated system (5), CAD modelling results of which are known, approaches the object (2) or an element of the working environment (3), and the movement is stopped when the tool (4) or a part of the polyarticulated system (5) is at a safe distance from an obstacle.

From the above, the operator who controls movement of the polyarticulated system (5), and in particular the 3D camera (16) carried, captures images (9) of details of the zones on which he/she wishes to carry out an operation. These images (9) of details of the object (2) are automatically integrated into the work image (17), thereby partially and more accurately reconstructing the object (2) and knowing details of its geometry in the place where the operation is to be carried out.

In the hypothesis formulated where several tools (4) of different types are available, the method comprises a step B' of selecting, in and for the simulation, from a tool database, the tool (4) that has to perform the operation.

Figure 5:
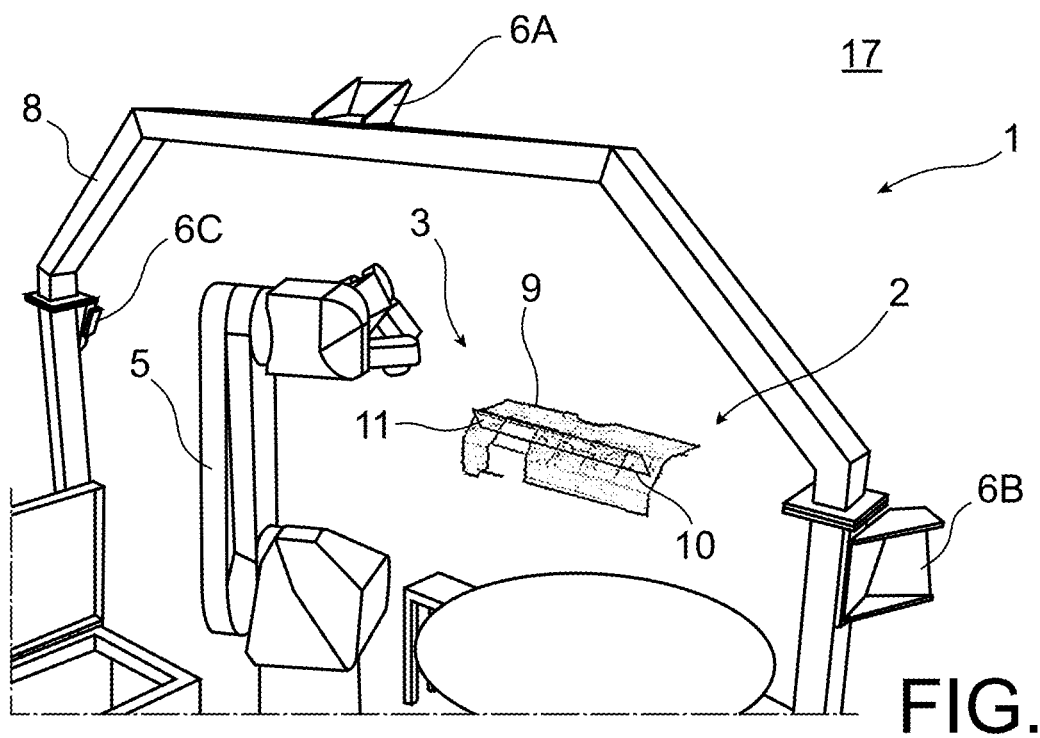
FIG. 5 is a similar view to that of FIG. 4, with a tool trajectory defined on the part of the work image representing the object.
Figure 6:
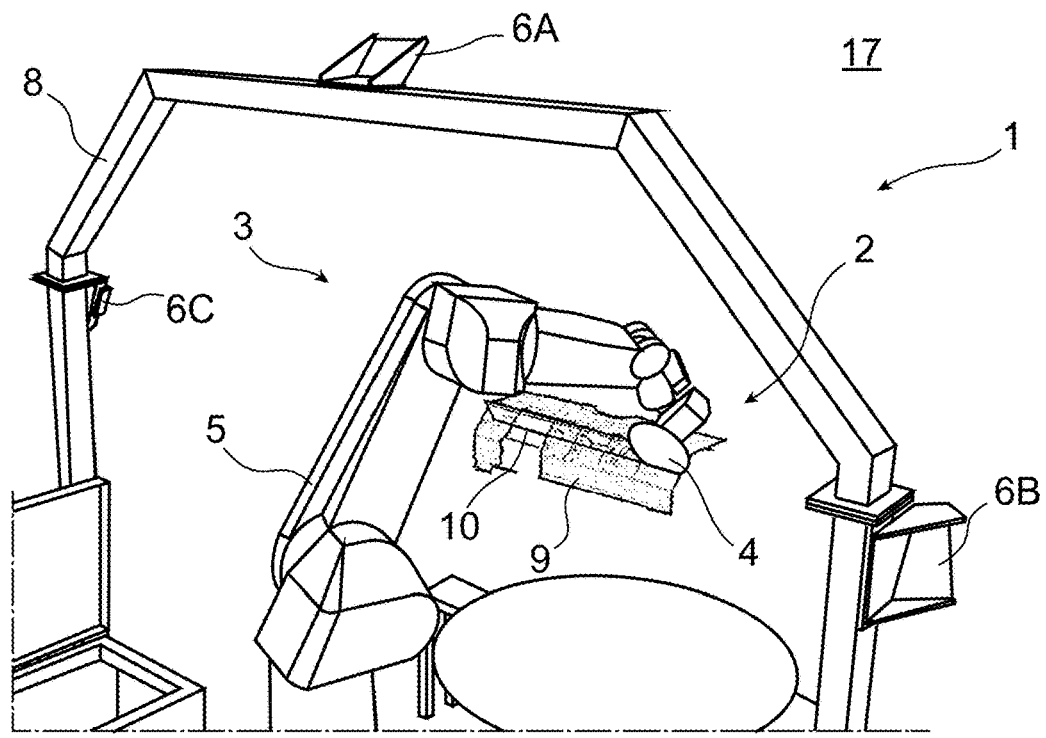
FIG. 6 is a schematic representation similar to that of FIG. 5 illustrating simulation of the movement of the polyarticulated system and the tool in the work image.

Then, with reference to FIG. 5, the method comprises a step B of defining a trajectory (10) of the tool (4) on the part of the work image (17) representing the object (2), and executing a simulation of the corresponding movement of the polyarticulated system (5) and the tool (4) in the work image (17) to ensure that the operation is feasible, in particular in terms of orientation, accessibility, and absence of collision, see FIG. 6.

By capturing images (9) of details of the object (2) and integrating them into the work image (17), the operator is provided with an increased accuracy support for defining and positioning the trajectories (10) of the tool (4).

To define trajectories (10), the operator can position on the work image (17) viewed on the display, a starting point-end point pair or a geometrical figure chosen from a library comprised of lines, planes or masks . . . and the computer processing system is designed to automatically calculate trajectories (10) on the object (2). If required, the processing system allows manual adjustment of the trajectory (10), or allows the operator to directly draw the trajectories (10) on the representation of the object (2).

Figure 7:
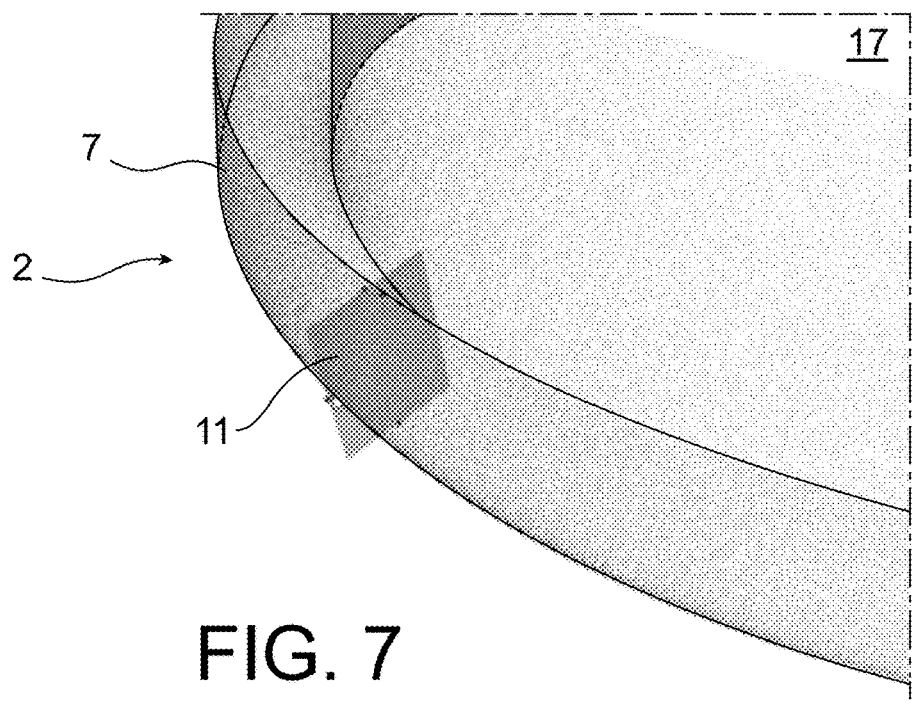
FIG. 7 illustrates in detail the positioning of a plane intersecting the part of the work image representing an object.
Figure 8:
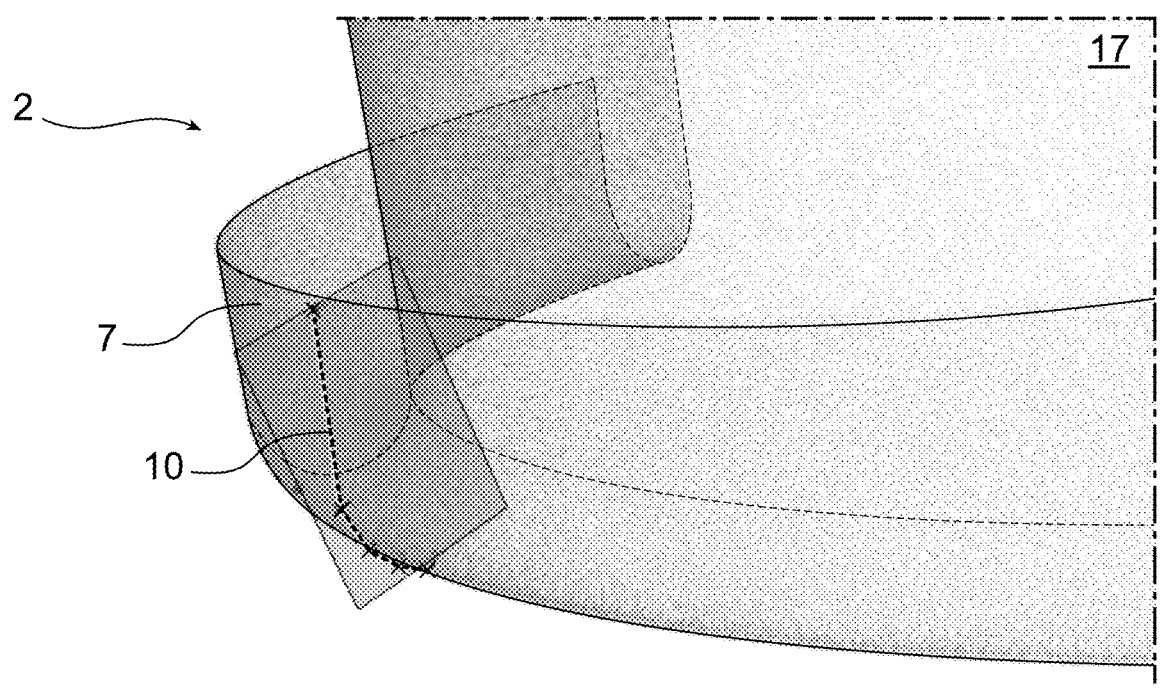
FIG. 8 is a similar representation to that of FIG. 7, with the trajectory resulting from the intersection between the positioned plane and the part of the work image representing the object being automatically calculated, for automatically calculating the movement trajectories of the polyarticulated system.
Figure 9:
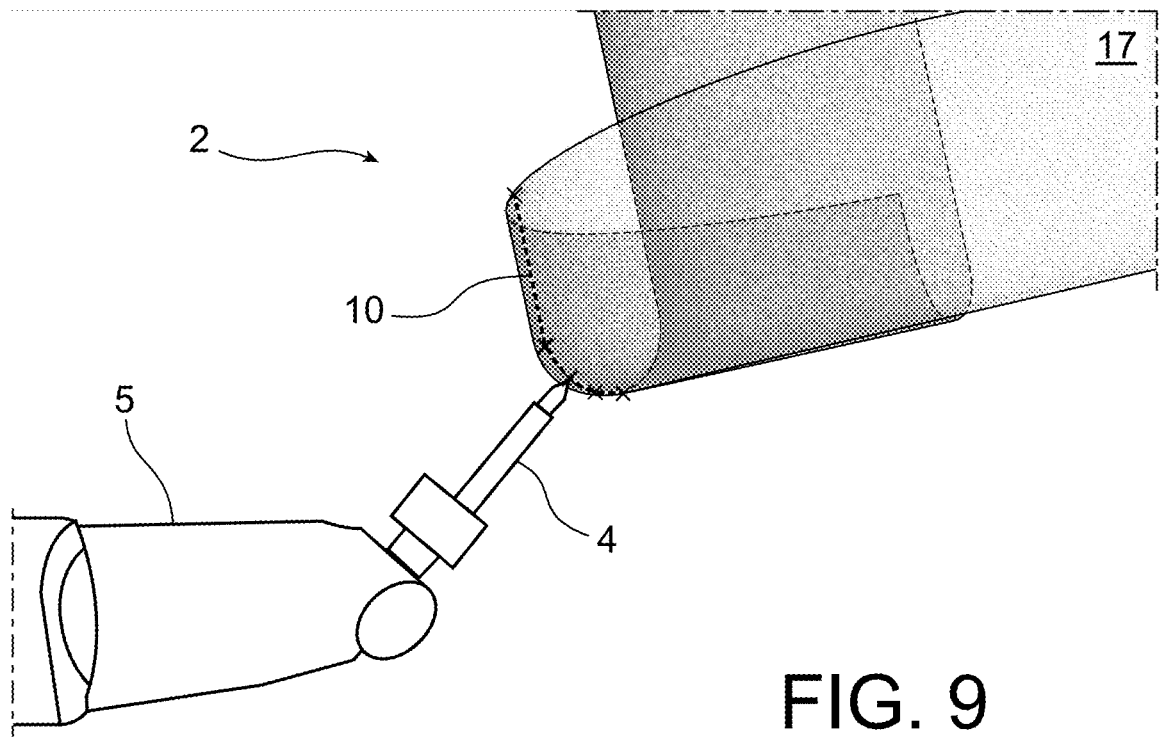
FIG. 9 illustrates the simulation phase of the movement of the polyarticulated system.

For example, with reference to FIG. 5, a plane (11) has been positioned on the representation of the surface of the object (2) to be cut, and the computer processing system has defined the trajectory (10) by the intersection between the plane (11) and said surface. This technique is also illustrated in FIG. 7, where the positioning of a plane (11) is seen, and in FIG. 8, where the trajectories (10) calculated and plotted from the intersection between the plane (11) and the representation of the object (2) are seen. After the trajectories (10) have been calculated, the computer processing system makes it possible to simulate the corresponding movement of the polyarticulated system (5) and the tool (4) in the work image (17) to ensure that the operation is feasible, depending of course on the tested trajectory (10), the tool (4) and accessibility and movement possibilities of the polyarticulated system (5). The movement testing steps are for example illustrated in FIGS. 6 and 9. If the simulation shows that the movement is possible, namely that it is possible in terms of orientation and accessibility, and that it does not cause any collisions between the different elements of the facility (1) and the working environment (3), the actual movement can be carried out. Step B is performed as many times as necessary to achieve an executable movement.

The method then advantageously comprises a step C' of automatically moving the polyarticulated system (5) to disconnect and deposit the 3D camera (16), for example in the dedicated bin, and connect to the tool (4) that had previously been selected, also stored nearby.

After connecting the tool (4), the method comprises a step C of, if the simulation has shown that the operation is feasible, executing the actual movement of the polyarticulated system (5) carrying the tool (4) along the trajectory (10) defined and validated to perform the operation as such on the object (2).

Figure 10:
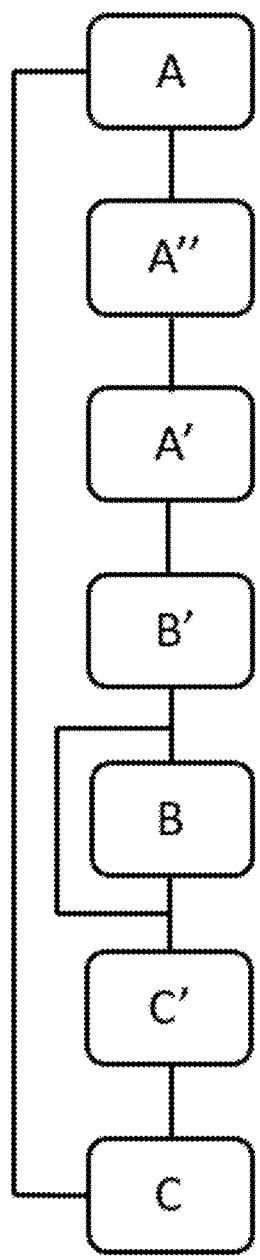
FIG. 10 represents a simplified flow chart of the method according to the invention.

Preferably, during step C and in order to avoid damaging the tool (4), the facility comprises a means for regulating, during step C and in real time, the speed of movement of the polyarticulated system (5) carrying the tool (4) in direct contact with the object (2), based on a direct or indirect measurement of the force undergone by the tool. For example, this measurement is obtained by measuring the current consumed by the tool (4) or by motors for moving the polyarticulated system (5) or is obtained by a force sensor positioned between the polyarticulated system (5) and the tool (4). To simplify understanding, the sequence of steps in the method appears in a simplified flowchart illustrated in FIG. 10.

Advantageously, when it is necessary to carry out several successive operations on the object (2), for example several cutting operations, the next cutting trajectory (10) is defined, in masked time, during the previous cutting operation, or several trajectories (10) are simulated and recorded in order to be performed one after the other in an order which can be modified by the operator.

The invention is also particularly advantageous in a changing environment, due to new elements or potential obstacles by adding objects or freeing up space, for example related to the cutting of the object (2), steps A to C of the method of the invention then being repeated in order to have the most up-to-date images and simulations possible for the continuation of operations on the object (2), in a facilitated manner and without risk of collision.

The display illustrates, in CAD mode, the facility (1), the object (2) and the different elements of the environment. Preferably, the polyarticulated system (5) is represented in interactive colours. In other words, the polyarticulated system (5) is represented in green, for example, and as one of its parts approaches an obstacle, the colour of the part concerned changes successively to orange when the polyarticulated system (5) and/or the tool (4) enters the collision risk zone defined by the collision management parameters and to red when the movement is stopped because the polyarticulated system (5) and/or the tool (4) has reached the threshold distance defined in the collision management parameters.

From the above, it becomes apparent that the invention provides a method and a facility (1) for performing, in an automatic and safe manner, an operation on an object (2) present in a working environment (3), the positions and geometries of the object and the working environment being changing and/or insufficiently defined to be able to perform the operation.

The method can be adapted to any type of geometry or nature of the object (2). The first step of securing the environment and the object (2) by digitisation in the form of an overall point cloud is performed with 3D cameras, which allows adaptation to any type of position and geometry of the object (2) and elements of the environment. The processing time is short, with 500,000 measurement points in one second. Details obtained from the environment are important, the information is continuous. This allows realistic rendering and modelling in real time, and the operator can easily visually check whether the reconstruction in a point cloud (7) is correct.

What is claimed is:

1. A method for automatically performing an operation on an object with a tool carried by a polyarticulated system movable in a working environment, wherein it comprises at least:

a step A of capturing, in the form of an overall point cloud, an image of the object and of all or part of the working environment with at least one 3D sensor; merging said image with a pre-existing CAD model of the polyarticulated system and a pre-existing CAD model of all or part of the working environment as built, this merging resulting in a work image; and defining anti-collision parameters;

a step B of defining a trajectory of the tool on the part of the work image representing the object, and executing a simulation of the corresponding movement of the polyarticulated system and the tool in the work image to ensure that the operation is feasible; and a step C of, if the operation is feasible according to step B, executing the actual movement of the polyarticulated system carrying the tool along the trajectory defined to perform the operation on the object.

2. The method according to claim 1, comprising a step A', between step A and step B, of controlling the movement of the polyarticulated system to capture images of details of zones of the object with a 3D sensor carried by the polyarticulated system, in the form of a point cloud which is denser and more accurate than the overall point cloud, and integrating the captured images of the corresponding zone of the object into the work image, as a replacement for the corresponding part from the overall point cloud.

3. The method according to claim 2, comprising a step A", between step A and step A', of automatically moving the polyarticulated system to grip and connect to the 3D sensor.

4. The method according to claim 1, comprising a step C', between step B and step C, of automatically moving the polyarticulated system to disconnect and deposit a 3D sensor and, connect to the tool.

5. The method according to claim 1, comprising, prior to step B, a step B' of selecting, in and for the simulation of step B, from a tool database, the tool that has to perform the operation.

6. The method according to claim 1, wherein, in step C, the speed of movement of the polyarticulated system carrying the tool in direct contact with the object is regulated in real time based on a direct or indirect measurement of the force undergone by the tool.

7. The method according to claim 1, wherein, during step A', the speed of movement of the polyarticulated system is automatically reduced when the 3D sensor or a part of the polyarticulated system approaches the object or an element of the working environment, and the movement is automatically stopped when the 3D sensor or a part of the polyarticulated system is at a safe distance from the object or an element of the working environment, according to the anticollision parameters defined in step A.

8. The method according to claim 1, wherein in that the trajectory of the tool on the part of the work image representing the object according to step B is defined by the positioning on the work image either of at least one starting point-ending point pair or of at least one predefined geometrical figure, in particular a plane, at least one line, or a mask.

9. A facility for automatically performing an operation on an object with a tool movable in a working environment, the facility comprising:
 a polyarticulated system carrying the tool; and
 a 3D sensor connected to a computer processing system and to a display, the computer processing system being configured to:
 represent on the display an overall point cloud of the object and of all or part of the working environment from images captured by the 3D sensor,
 represent a work image resulting from merging the overall point cloud, of a pre-existing CAD model of the polyarticulated system and of a pre-existing CAD model of all or part of the working environment,
 allow a trajectory of the tool to be defined on the part of the work image representing the object,
 execute a simulation of the corresponding movement of the polyarticulated system and the tool in the work image to ensure that the operation is feasible, and
 execute the actual movement of the polyarticulated system carrying the tool along the trajectory defined for performing the operation as such on the object.

10. The facility according to claim 9, further comprising means for regulating, during the actual movement of the polyarticulated system, a speed of movement of the polyarticulated system carrying the tool in direct contact with the object, based on a direct or indirect measurement of the force undergone by the tool.

* * * * *